(12) United States Patent
Lin et al.

(10) Patent No.: US 8,959,255 B2
(45) Date of Patent: Feb. 17, 2015

(54) COMPUTER PROTECTION SYSTEM AND METHOD

(75) Inventors: Richard S. Lin, Houston, TX (US);
Monji G. Jabori, Houston, TX (US);
Dallas M. Barlow, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 581 days.

(21) Appl. No.: 11/261,730

(22) Filed: Oct. 27, 2005

(65) Prior Publication Data

US 2007/0130378 A1 Jun. 7, 2007

(51) Int. Cl.
*G06F 3/00* (2006.01)
*G06F 5/00* (2006.01)
*G06F 13/00* (2006.01)
*G06F 1/32* (2006.01)
*G06F 1/16* (2006.01)
*G06F 1/26* (2006.01)

(52) U.S. Cl.
CPC ............ *G06F 1/3215* (2013.01); *G06F 1/1677* (2013.01); *G06F 1/1616* (2013.01); *G06F 1/3234* (2013.01); *G06F 1/3206* (2013.01); *G06F 1/263* (2013.01); *G06F 1/3218* (2013.01)
USPC .................................. 710/15; 710/19; 714/30

(58) Field of Classification Search
CPC ... G06F 1/1677; G06F 1/1616; G06F 1/3206; G06F 1/3234
USPC ............................................................ 710/15
See application file for complete search history.

(56) References Cited

U.S. PATENT DOCUMENTS

| | | | |
|---|---|---|---|
| 5,021,983 A | 6/1991 | Nguyen et al. | |
| 5,303,171 A | 4/1994 | Belt et al. | |
| 5,345,392 A * | 9/1994 | Mito et al. | 713/300 |
| 5,526,493 A | 6/1996 | Shu | |
| 5,748,972 A | 5/1998 | Clark et al. | |
| 5,974,261 A | 10/1999 | Fakhruddin et al. | |
| 6,044,422 A * | 3/2000 | Tran | 710/69 |
| 6,145,068 A * | 11/2000 | Lewis | 711/170 |
| 6,243,819 B1 | 6/2001 | Jung | |
| 6,647,472 B2 | 11/2003 | Atkinson et al. | |
| 7,053,883 B1 * | 5/2006 | Kwok et al. | 345/156 |
| 7,366,923 B2 * | 4/2008 | Chaiken et al. | 713/300 |
| 2002/0171546 A1 * | 11/2002 | Evans et al. | 340/540 |

* cited by examiner

*Primary Examiner* — Zachary K Huson
(74) *Attorney, Agent, or Firm* — Hewlett-Packard Patent Department (57) ABSTRACT

A computer protection system comprises a mobile detection module adapted to detect at least one event indicating a likelihood of movement of a computer and, in response to detecting the at least one event, automatically place a drive device of the computer in a suspend state.

29 Claims, 5 Drawing Sheets

FIG. 1

COMPUTER PROTECTION SYSTEM AND METHOD

BACKGROUND OF THE INVENTION

Computer devices generally include a hard drive and/or other types of drive devices for storing computer programs, data and a variety of other human- and/or machine-readable information. However, such drive devices are sensitive to shocks and vibrations, especially during operation of the drive device. Thus, with many computer devices having mobile capabilities (e.g., notebook or laptop computers), such shocks and/or vibrations are increasingly likely to occur, thereby potentially causing damage to the drive device and/or significant data loss.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

Figure 1:
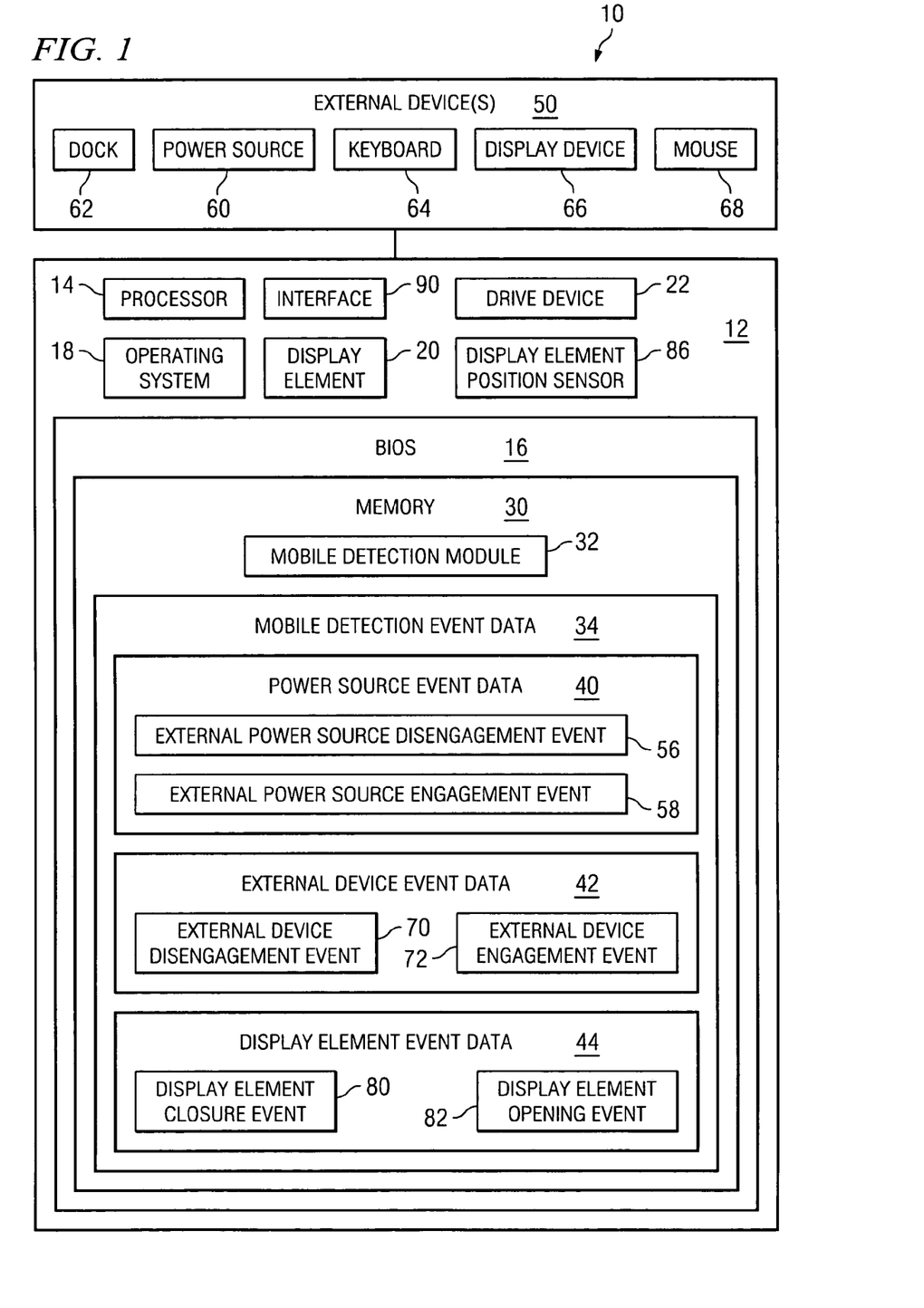
FIG. 1 is a diagram illustrating an embodiment of a computer protection system in accordance with the present invention.

FIG. 1 is a diagram illustrating an embodiment of a computer protection system 10 in accordance with the present invention. In the embodiment illustrated in FIG. 1, system 10 comprises a computer 12 having a processor 14, a basic input/output system (BIOS) 16, and an operating system (O/S) 18. Computer 12 may comprise any type of computing device such as, but not limited to, a portable laptop or notebook computer, tablet computer, or a desktop computer. For example, in the embodiment illustrated in FIG. 1, computer 12 comprises a portable computer (e.g., a laptop or notebook computer) having a display element 20 (e.g., a device used to display an image (e.g., a liquid crystal display) and/or a lid having a device used to display an image) adapted to be closed relative to a base member. In the embodiment illustrated in FIG. 1, computer 12 also comprises a drive device 22 such as, but not limited to, a hard drive. In FIG. 1, a single drive device 22 is illustrated. However, it should be understood that the present invention may be applied and/or otherwise used in connection with multiple drive devices. In operation, embodiments of the present invention eliminate or substantially prevent damage, data loss, and/or other undesirable effects from occurring to drive device 22 resulting from movement of computer 12 by detecting events indicating a likelihood or possibility of future movement of computer 12, thereby anticipating such movement before actual movement of computer 12 and placing drive device 22 in a suspend mode.

In the embodiment illustrated in FIG. 1, BIOS 16 comprises a memory 30 having a mobile detection module 32 and mobile detection event data 34. Mobile detection module 32 may comprise hardware, software, or a combination of hardware and software. In the embodiment illustrated in FIG. 1, mobile detection module 32 is illustrated as being stored within BIOS 16. However, it should be understood that mobile detection module 32 may be otherwise stored (e.g., on another or a different platform) of computer 12. Mobile detection event data 34 comprises information associated with events relating to computer 12 detected and/or used by mobile detection module 32 to determine a mobility status of computer 12 (e.g., events used to anticipate and/or otherwise indicate a likelihood of movement of computer 12 and/or events indicating a cessation of movement of computer 12). In the embodiment illustrated in FIG. 1, mobile detection event data 34 is illustrated as being stored in memory 30 of BIOS 16. However, it should be understood that mobile detection event data 34 may be otherwise stored on computer 12.

In the embodiment illustrated in FIG. 1, mobile detection event data 34 comprises power source event data 40, external device event data 42, and display element event data 44. Power source event data 40 comprises information used to anticipate and/or otherwise indicate a likelihood of future movement of computer 12 and/or cessation of movement of computer 12 based on a source of power for computer 12. External device event data 42 comprises information used to anticipate and/or otherwise indicate a likelihood of movement of computer 12 and/or cessation of movement of computer 12 based on engagement/disengagement of external device(s) 50 to computer 12. Display element event data 44 comprises information used to anticipate and/or otherwise indicate a likelihood of movement of computer 12 and/or cessation of movement of computer 12 based on a position, status and/or other characteristic associated with display element 20. However, it should be understood that other types of events may be used to anticipate and/or otherwise indicate a likelihood of movement of computer 12 and/or a cessation of movement of computer 12. In operation, mobile detection module 32 uses mobile detection event data 34 to automatically place drive device 22 in a sleep or suspend state prior to such movement, thereby eliminating or substantially preventing damage and/or data loss which may be otherwise associated with movement of computer 12 and the waking of drive device 22 from a sleep or suspend state before cessation of movement of computer 12. Preferably, embodiments of the present invention are configured such that drive device 22 is placed in a level of sleep/suspend/standby state to decrease latency associated with entering and/or exiting such suspend state.

As described above, mobile detection module 32 uses various types of information, identified as events, to anticipate and/or otherwise indicate a likelihood of movement of computer 12 and/or cessation of movement of computer 12. For example, in the embodiment illustrated in FIG. 1, power source event data 40 comprises information associated with an external power source disengagement event 56 and an external power source engagement event 58. For example, an external power source 60 may be coupled to computer 12 for providing power for operations associated with computer 12. Thus, in operation, mobile detection module(s) 32 uses information associated with the engagement and/or disengagement of external power source 60 relative to computer 12 to anticipate and/or otherwise indicate a likelihood of movement of computer 12 and/or cessation of movement of computer 12 to suspend or wake, respectively, drive device 22. For example, external power source disengagement event 56 represents a disengagement of external power source 60 from computer 12, thereby indicating a likelihood that a user of computer 12 is about to make computer 12 mobile. Correspondingly, external power source engagement event 58 represents the engagement of external power source 60 to computer 12, thereby indicating that a user has ceased movement of computer 12. It should be understood that various types of methods and/or devices (e.g., mechanical and/or hardware/software-based) may be used to detect the engagement and/or disengagement of external power source 60 relative to computer 12.

External device event data 42 comprises information used by mobile detection module 32 to anticipate and/or otherwise indicate a likelihood of movement of computer 12 and/or cessation of movement of computer 12 based on the engagement and/or disengagement of external device(s) 50 relative to computer 12. For example, in some embodiments of the present invention, computer 12 is configured to be coupled to a variety of types of external devices 50 such as, but not limited to, a dock 62, a keyboard 64, a monitor or other type of display device 66, and a mouse 68. It should be understood that other types of external device(s) 50 may also be couplable to computer 12 (e.g., a printer, external universal serial bus (USB) hub, and a stylus for a tablet computer (e.g., in a storage or parking location)). Thus, as illustrated in the embodiment illustrated in FIG. 1, external device event data 42 comprises an external device disengagement event 70 and an external device engagement event 72. External device disengagement event 70 represents a disengagement of at least one external device 50 from computer 12 used by mobile detection module 32 to anticipate and/or otherwise indicate a likelihood of movement of computer 12. External device engagement event 72 represents an engagement of at least one external device 50 to computer 12, thereby indicating a likelihood of a cessation of movement of computer 12. It should be understood that various types of devices and/or methods (e.g., mechanical and/or hardware/software-based) may be used to detect the engagement and/or disengagement of external device(s) 50 relative to computer 12. Thus, in operation, mobile detection module 32 uses information associated with the disengagement and/or engagement of external device(s) 50 to automatically suspend or wake, respectively, drive device 22.

Display element event data 44 comprises information used by mobile detection module 32 to anticipate and/or otherwise indicate a likelihood of movement of computer 12 and/or a cessation of movement of computer 12 based on a position, status and/or other characteristic associated with display element 20. For example, in the embodiment illustrated in FIG. 1, display element event data 44 comprises a display element closure event 80 and a display element opening event 82. Display element closure event 80 represents the closing of display element 20 of computer 12 (e.g., display element 20 in a closed position and/or movement of display element 20 toward a closed position), and display element opening event 82 represents the opening of display element 20 of computer 12 (e.g., display element 20 in an open position and/or movement of display element 20 toward an open position). For example, in the embodiment illustrated in FIG. 1, computer 12 comprises a display element position sensor 86 for detecting a position of display element 20 of computer 12 (e.g., a position of display element 20 relative to a base member of a notebook or laptop computer). Thus, for example, in some embodiments of the present invention, mobile detection module 32 uses a display element closure event 80 to anticipate and/or otherwise indicate a likelihood of movement of computer 12 to automatically place drive device 22 in a sleep or suspend state. Correspondingly, in some embodiments of the present invention, mobile detection module 32 uses display element opening event 82 to indicate a cessation of movement of computer 12 to automatically wake drive device 22 from a sleep or suspend state. It should be understood that various types of devices and/or methods may be used to detect and/or otherwise indicate a status or position of display element 20 of computer 12 (e.g., mechanical and/or hardware/software-based).

Thus, in operation, mobile detection module 32 uses various types of events associated with computer 12 to anticipate movement of computer 12 and automatically place drive device 22 in a sleep or suspend state prior to such movement based on the detection of such event. In some embodiments of the present invention, mobile detection module 32 is configured to automatically place drive device 22 in a sleep or suspend state based on the detection of a single event indicating a likelihood or anticipated movement of computer 12. For example, in some embodiments of the present invention, mobile detection module 32 is configured to automatically place drive device 22 in a sleep or suspend state based on the occurrence of display element closure event 80. In other embodiments of the present invention, mobile detection module 32 is configured to automatically place drive device 22 in a sleep or suspend state based on the occurrence of multiple or a combination of events. For example, in some embodiments of the present invention, mobile detection module 32 is configured to automatically place drive device 22 in a sleep or suspend state based on the occurrence of external power source disengagement event 56 in combination with external device disengagement event 70. Thus, for example, in such an embodiment of the present invention, mobile detection module 32 monitors the engagement status of power source 60 and external device(s) 50. If mobile detection module 32 detects external power source disengagement event 56 indicating a disengagement of power source 60 from computer 12, mobile detection module 32 also determines whether at least one external device 50 has also been disengaged from computer 12, thereby indicating a likelihood of movement of computer 12. However, it should be understood that a single event (e.g., based only on disengagement of an external device) may also be used to indicate a likelihood of movement for placing drive device 22 in a sleep or suspend state. Further, it should be understood that in some embodiments of the present invention, drive device 22 may be placed in a sleep or suspend state after clearing of a drive device 22 busy status.

A variety of different methods may be used by mobile detection module 32 to place drive device 22 in a sleep or suspend state and to wake drive device 22 from the sleep or suspend state. For example, in some embodiments of the present invention, mobile detection module 32 causes BIOS 16 to communicate with an O/S 18 applet to initiate a sleep or suspend state at the O/S 18 level. For example, in such an embodiment of the present invention, an applet is registered for a scan code and/or a WINDOWS management instrumentation (WMI) event such that upon the occurrence of such scan code and/or WMI event, the applet retrieves and sets fields within O/S 18 for selecting and/or initiating the desired level of sleep or suspend state for drive device 22. In other embodiments of the present invention, a system management interrupt (SMI) handler and system management mode (SMM) timer are used to detect events anticipating and/or otherwise indicating that computer 12 is about to go mobile. For example, in such embodiments of the present invention, with each SMM timer interrupt, SMI handler checks the status of various types of events used by mobile detection module 32 to anticipate the movement of computer 12. When SMI handler detects at least one event used by mobile detection module 32 indicating a likelihood of movement of computer 12, the status of drive device 22 is monitored and, when a drive device 22 busy status clears, SMI handler writes a command to suspend drive device 22. Once drive device 22 is placed in the sleep or suspend state, SMI handler will loop on the sleep and/or suspend state to reduce power until either the next SMM timer interrupt or another event is generated. Thus, it should be understood that a variety of hardware- and/or software-based methods may be used for entering and/or exiting the sleep or suspend state for drive device 22.

In some embodiments of the present invention, system 10 is configured to enable a user to place drive device 22 in a sleep or suspend state before movement of computer 12 by the user. For example, in the embodiment illustrated in FIG. 1, computer 12 comprises an interface 90 for receiving a request/input by the user to enter or exit a sleep or suspend state of drive device 22 corresponding to a movement status of computer 12. Interface 90 may comprise a hardware- and/or software-based interface mechanism for receiving a request from the user to enter or exit a sleep or suspend state of drive device 22 (e.g., a keystroke combination on a keyboard (e.g., a keyboard of computer 12 and/or external keyboard 64), selectable icon or a menu item from a display interface (e.g., display element 20 and/or external display device 66), and/or a button or switch physically actuatable by a user). Thus, in operation, embodiments of the present invention enable a user to place drive device 22 in a suspend state before movement of computer 12 via interface 90. Further, in the event a user forgets to provide input to computer 12 via interface 90 to place drive device 22 in a suspend state, detection module 32 detects events indicating a likelihood of such movement and automatically places drive device 22 in the suspend state before such movement, thereby providing an automatic backup system/method to the user.

Figure 2:
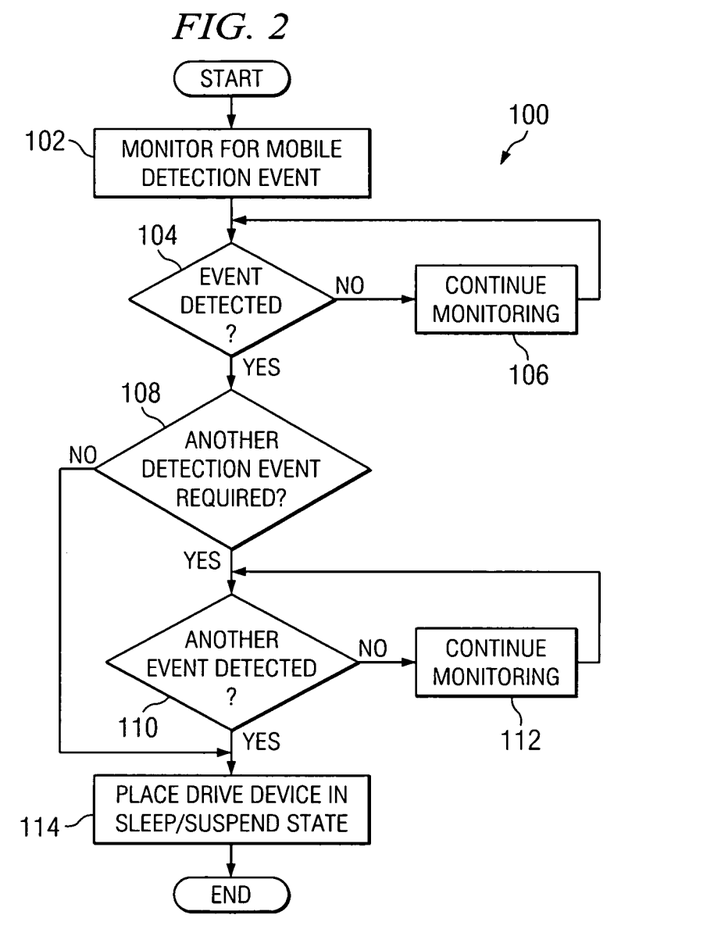
FIG. 2 is a flow diagram illustrating embodiments of a computer protection method in accordance with the present invention.

FIG. 2 is a flow diagram illustrating embodiments of a computer protection method 100 in accordance with the present invention. The method begins at block 102, where mobile detection module 32 monitors computer 12 for a mobile detection event such as, but not limited to, external power source disengagement event 56, external device disengagement event 70 and/or display element closure event 80. At block 104, a determination is made whether an event indicating anticipated movement of computer 12 is detected. If an event indicating a likelihood of movement of computer 12 is not detected at block 104, the method proceeds to block 106, where mobile detection module 32 continues monitoring for such events. If an event indicating a likelihood of movement of computer 12 is detected at block 104, the method proceeds to decisional block 108, where a determination is made whether detection of another event indicating a likelihood of movement of computer 12 is required before placing drive device 22 in a sleep or suspend state. For example, as described above, system 10 may be configured such that either a single event or a combination of events are used to determine a likelihood of movement of computer 12 for placing drive device 22 in a sleep or suspend state (e.g., A or (B and C); A or B or C; (A and B) or (A and C) or (B and C); (A or B) and C; etc., where "A," "B" and C" represent different events).

Thus, in the embodiment illustrated in FIG. 2, a combination of events indicating a likelihood of movement of computer 12 is used for placing drive device 22 in a sleep or suspend state (e.g., two different events; however it should be understood that either a single event or a greater number of events may be used as an indication of a likelihood of movement of computer 12). Thus, if another event indicating a likelihood of movement of computer 12 is required for the particular embodiment of the invention, the method proceeds to decisional block 110, where a determination is made whether another event indicating a likelihood of movement of computer 12 is detected. If another event indicating a likelihood of movement of computer 12 is not detected, the method proceeds to block 112, where mobile detection module 32 continues monitoring computer 12 for such events. If another event indicating a likelihood of movement of computer 12 is detected at block 110, the method proceeds to block 114, where mobile detection module 32 automatically places drive device 22 in a sleep or suspend state. At decisional block 108, if detection of another event indicating a likelihood of movement of computer 12 is not required, the method proceeds from decisional block 108 to block 114, where mobile detection module 32 automatically places drive device 22 in a sleep or suspend state.

Figure 3:
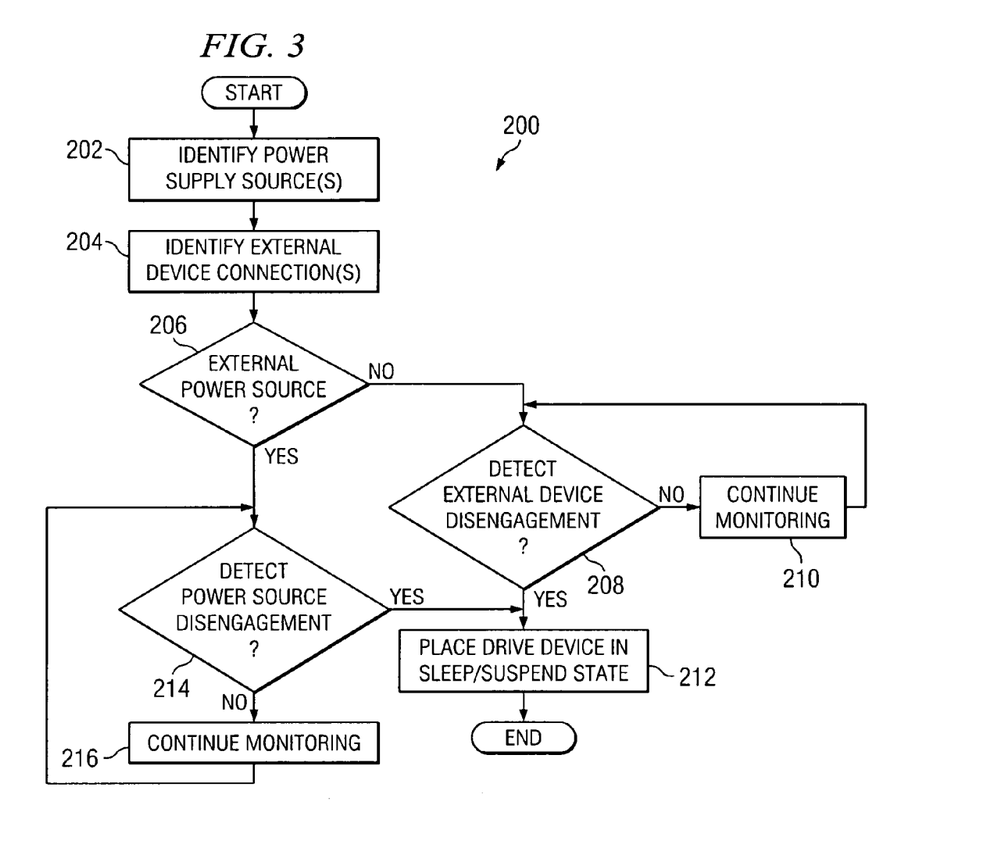
FIG. 3 is a flow diagram illustrating additional embodiments of a computer protection method in accordance with the present invention.

FIG. 3 is a flow diagram illustrating additional embodiments of a computer protection method 200 in accordance with the present invention. In the illustrated embodiment, disengagement of power source and external 60 and another external device 50 from computer 12 are used to indicate a likelihood of movement of computer 12; however, it should be understood that other types of events may be used. In FIG. 3, the method begins at block 202, where mobile detection module 32 determines or otherwise identifies power supply sources for a computer 12 (e.g., an internal battery source and/or an external battery or alternating current (A/C) power source). At block 204, mobile detection module 32 determines or otherwise identifies external device(s) 50 connected or otherwise coupled to computer 12. At decisional 206, a determination is made whether external power source 60 is providing power to computer 12. If external power source 60 is not providing power to computer 12, the method proceeds to decisional block 208, where mobile detection module 32 determines whether external device disengagement event 70 has occurred. If external device disengagement event 70 has not occurred, the method proceeds to block 210, where mobile detection module 32 continues monitoring for disengagement of external device(s) 50 relative to computer 12. At decisional block 208, if mobile detection module 32 detects external device disengagement event 70, the method proceeds to block 212, where a mobile detection module 32 places drive device 22 in a sleep or suspend state.

At decisional block 206, if external power source 60 is supplying power to computer 12, the method proceeds to decisional block 214, where a determination is made whether external power source disengagement event 56 is detected. If external power source disengagement event 56 is not detected, the method proceeds to block 216, where a mobile detection module 32 continues monitoring the engagement status of external power source 60 to computer 12. If external power source disengagement event 56 is detected at decisional block 214, the method proceeds to block 212, where mobile detection module 32 places drive device 22 in a sleep or suspend state.

Figure 4:
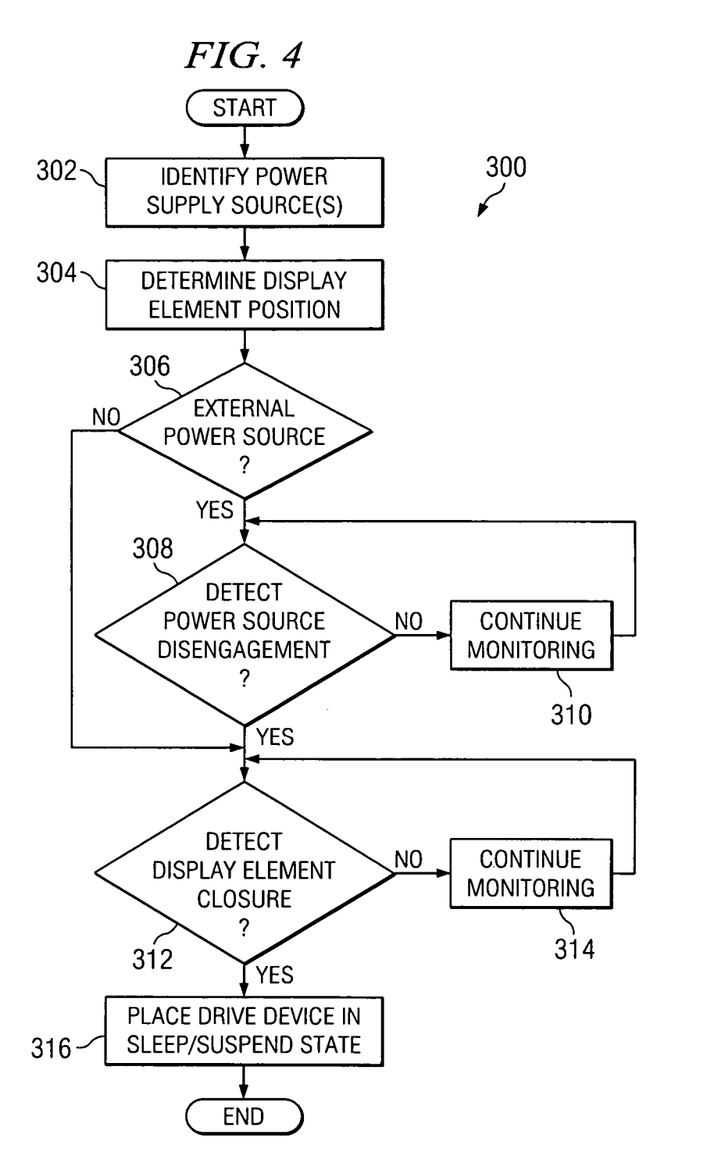
FIG. 4 is a flow diagram illustrating additional embodiments of a computer protection method in accordance with the present invention.

FIG. 4 is a flow diagram illustrating additional embodiments of a computer protection method 300 in accordance with the present invention. In the illustrated embodiment, disengagement of power source and external 60 and display element 20 closure are used to indicate a likelihood of movement of computer 12; however, it should be understood that other types of events may be used. In FIG. 4, the method begins at block 302, where mobile detection module 32 determines or otherwise identifies power sources for a computer 12. At block 304, mobile detection module 32 determines or otherwise identifies a position of display element 20 of computer 12. For the remainder of the method illustrated in FIG. 4, the method is described based on display element 20 being currently in an open position. However, it should be understood that the method described in association with FIG. 4 may be otherwise modified corresponding to a different current position of display element 20.

At decisional block 306, a determination is made whether power is being supplied to computer 12 via external power source 60. If power is being supplied to computer 12 via external power source 60, the method proceeds to decisional 308, where a determination is made whether mobile detection module 32 has detected external power source disengagement event 56. If mobile detection module 32 has not detected external power source disengagement event 56, the method proceeds to block 310, where a mobile detection module 32 continues monitoring the engagement status of external power source 60. If mobile detection module 32 has detected external power source disengagement event 56, the method proceeds to decisional block 312. At decisional block 306, if a determination is made that power is not being supplied to computer 12 via external power source 60, the method proceeds to decisional block 312. At decisional block 312, a determination is made whether mobile detection module 32 has detected display element closure event 80 for a display element 20. If mobile detection module 32 has not detected display element closure event 80, the method proceeds to block 314, where mobile detection module 32 continues monitoring the positional status of display element 20. If mobile detection module 32 has detected display element closure event 80 at decisional 312, the method proceeds to block 316, where mobile detection module 32 automatically places drive device 22 in a sleep or suspend state.

Figure 5:
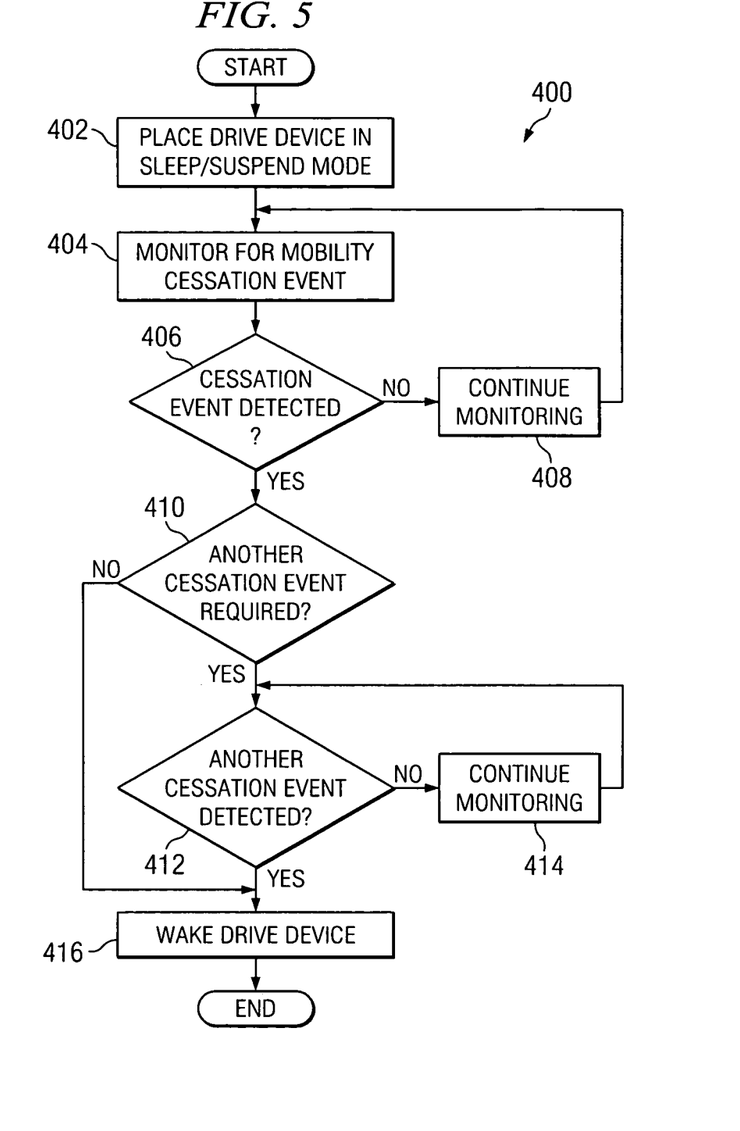
FIG. 5 is a flow diagram illustrating yet additional embodiments of a computer protection method in accordance with the present invention.

FIG. 5 is a flow diagram illustrating yet additional embodiments of a computer protection method 400 in accordance with the present invention. The method begins at block 402, where drive device 22 is placed in a sleep/suspend mode (however, it should be understood that drive device 22 may already be in a sleep/suspend mode). At block 404, mobile detection module 32 monitors computer 12 for a mobility cessation event indicating a likelihood of discontinued movement of computer 12 such as, but not limited to, external power source engagement event 58, external device engagement event 72 and/or display element opening event 82. At block 406, a determination is made whether an event indicating cessation of movement of computer 12 is detected. If an event indicating cessation of movement of computer 12 is not detected at block 406, the method proceeds to block 408, where mobile detection module 32 continues monitoring for such events. If an event indicating cessation of movement of computer 12 is detected at block 406, the method proceeds to decisional block 410, where a determination is made whether detection of another cessation event indicating cessation of movement of computer 12 is required before waking drive device 22 from the sleep/suspend state. For example, as described above, system 10 may be configured such that either a single event or a combination of events are used to determine cessation of movement of computer 12 for waking drive device 22. Thus, if another event indicating cessation of movement of computer 12 is required, the method proceeds to decisional block 412, where a determination is made whether another event indicating cessation of movement of computer 12 is detected. If another event indicating cessation of movement of computer 12 is not detected, the method proceeds to block 414, where mobile detection module 32 continues monitoring computer 12 for such events. If another event indicating cessation of movement of computer 12 is detected at block 412, the method proceeds to block 416, where mobile detection module 32 automatically wakes drive device 22. At decisional block 410, if detection of another event indicating cessation of movement of computer 12 is not required, the method proceeds from decisional block 410 to block 416, where mobile detection module 32 automatically wakes drive device 22.

Thus, embodiments of the present invention provide a system and method for detecting events anticipating and/or otherwise indicating a likelihood of movement of a computer device to automatically park a drive device (e.g., place the drive device into a sleep and/or suspend mode). Embodiments of the present invention also provide a system and method for detecting events indicating a likelihood of cessation of movement of a computer device for automatically waking the drive device from the sleep/suspend state.

What is claimed is:

1. A computer protection system, comprising:
   a mobile detection module to:
   detect a first event indicating a likelihood of movement of a computer, wherein the first event comprises a disengagement of an external device from the computer;
   in response to detecting the first event, start to monitor for a second event indicating an increased likelihood of movement of the computer, wherein the second event comprises a closing of a display element of the computer; and
   if the second event is detected, automatically place a drive device of the computer in a powered suspend state based on the first event and the second event.

2. The system of claim 1, wherein the external device comprises an external power source.

3. The system of claim 1, wherein the external device comprises a dock, a keyboard, a monitor, an external universal serial bus (USB) hub, a printer, or a mouse, or any combinations thereof.

4. The system of claim 1, wherein the mobile detection module causes an operating system of the computer to place the drive device in the powered suspend state.

5. The system of claim 1, wherein the mobile detection module is disposed in a basic input/output system (BIOS) of the computer.

6. The system of claim 1, wherein the mobile detection module automatically places the drive device in the powered suspend state upon clearing of a drive device busy status.

7. The system of claim 1, wherein the mobile detection module automatically wakes the drive device from the powered suspend state.

8. The system of claim 1, wherein the mobile detection module detects at least one event indicating a likelihood of cessation of the movement of the computer.

9. The system of claim 1, wherein the mobile detection module places the drive device of the computer in the powered suspend state before the movement of the computer.

10. The system of claim 1, wherein the second event further comprises parking of a stylus.

11. A computer protection system, comprising:
    means for detecting a first event indicating a likelihood of movement of a computer, wherein the first event comprises a disengagement of an external device from the computer;
    means for monitoring for a second event indicating an increased likelihood of movement of the computer in response to detecting the first event, wherein the second event comprises a closing of a display element of the computer; and means for automatically placing a drive device of the computer in a powered suspend state if the second event is detected.

12. The system of claim 11, wherein the external device comprises a monitor, a mouse, a keyboard, an external universal serial bus (USB) hub, a printer, or a dock, or any combinations thereof.

13. The system of claim 11, wherein the means for automatically placing the drive device in the powered suspend state comprises means for automatically placing the drive device in the powered suspend state upon completion of a drive device busy status.

14. The system of claim 11, further comprising means for automatically waking the drive device from the powered suspend state.

15. The system of claim 11, further comprising means for detecting at least one event indicating a likelihood of cessation of the movement of the computer.

16. A computer protection method, comprising:
    detecting a first event indicating a likelihood of movement of a computer, wherein the first event comprises a disengagement of an external device from the computer;
    in response to detecting the first event, monitor for a second event indicating an increased likelihood of movement of the computer, wherein the second event comprises a closing of a display element of the computer; and
    if the second event is detected, automatically placing a drive device of the computer in a powered suspend state based on the first event and the second event.

17. The method of claim 16, wherein the external device comprises an external power source.

18. The method of claim 16, wherein the external device comprises a mouse, a keyboard, a monitor, a printer, an external universal serial bus (USB) hub, or a dock, or any combinations thereof.

19. The method of claim 16, further comprising detecting at least one event indicating cessation of the movement.

20. The method of claim 16, wherein automatically placing the drive device in the powered suspend state comprises placing the drive device in the powered suspend state upon completion of a drive device busy status.

21. The method of claim 16, wherein automatically placing the drive device in the powered suspend state comprises causing an operating system of the computer to place the drive device in the powered suspend state.

22. The method of claim 16, further comprising automatically waking the drive device from the powered suspend state in response to another event.

23. The method of claim 16, further comprising placing the drive device of the computer in the powered suspend state before movement of the computer.

24. A computer protection system, comprising:
    a mobile detection module to:
    detect a first event indicating a likelihood of cessation of movement of a computer;
    in response to detecting first event, monitor for a second event indicating an increased likelihood of cessation of movement of the computer; and
    if the second event is detected, automatically wake a drive device of the computer from a powered suspend state based on the first event and the second event.

25. The system of claim 24, wherein the first event or the second event comprises an engagement of an external power source to the computer.

26. The system of claim 24, wherein the first event or the second event comprises an engagement of at least one of a group consisting of a mouse, a keyboard, a monitor, a printer, an external universal serial bus (USB) hub and a dock with the computer.

27. The system of claim 1, wherein just a sequence of the second event occurring after the first event occurs results in the mobile detection module automatically placing the drive device in the powered suspend state.

28. The system of claim 1, wherein prior to the first event being detected, the mobile detection module does not monitor for the second event.

29. The system of claim 1, wherein a sequence of the first event occurring after the second event occurs does not result in the mobile detection module automatically placing the drive device in the powered suspend state.

* * * * *